United States Patent
Fujiki et al.

(10) Patent No.: US 7,381,349 B2
(45) Date of Patent: Jun. 3, 2008

(54) PROCESS FOR PRODUCING LIQUID CRYSTAL OF DESIRED PROPERTIES BY MIXING TOGETHER AT LEAST TWO RIGID RODLIKE HELICAL POLYMERS WITH NARROW MOLECULAR WEIGHT DISTRIBUTIONS AND DIFFERENT WEIGHT-AVERAGE MOLECULAR WEIGHTS WITH CHIRAL SIDE CHAINS

(75) Inventors: Michiya Fujiki, Nara (JP); Junji Watanabe, Kanagawa (JP); Kento Okoshi, Nara (JP)

(73) Assignee: Japan Science and Technology Agency, Saitama (JP)

( * ) Notice: Subject to any disclaimer, the term of this patent is extended or adjusted under 35 U.S.C. 154(b) by 431 days.

(21) Appl. No.: 10/515,922

(22) PCT Filed: Apr. 14, 2003

(86) PCT No.: PCT/JP03/04698

§ 371 (c)(1),
(2), (4) Date: Nov. 30, 2004

(87) PCT Pub. No.: WO03/106538

PCT Pub. Date: Dec. 24, 2003

(65) Prior Publication Data

US 2005/0224752 A1    Oct. 13, 2005

(30) Foreign Application Priority Data

Jun. 17, 2002    (JP) .............................. 2002-175277

(51) Int. Cl.
*C09K 19/52*    (2006.01)
*C09K 19/00*    (2006.01)
*C09K 19/02*    (2006.01)
*C07D 305/00*    (2006.01)
*C07F 7/18*    (2006.01)

(52) U.S. Cl. .................... 252/299.01; 430/449; 430/20; 349/183; 252/582; 549/214; 106/287.13

(58) Field of Classification Search ........... 252/299.01, 252/582; 349/183; 549/214; 106/287.13; 430/449, 20
See application file for complete search history.

(56) References Cited

U.S. PATENT DOCUMENTS 6,267,910 B1 * 7/2001 Hayashi et al. ........ 252/299.01
6,716,373 B2 * 4/2004 Fujiki et al. ................. 252/582

FOREIGN PATENT DOCUMENTS

| EP | 0 295 106 | 12/1988 |
| EP | 0322703 | 7/1989 |
| JP | 02-202585 | 8/1990 |
| JP | 2000-344876 A | 12/2000 |
| JP | 2001-164251 A | 6/2001 |

* cited by examiner

*Primary Examiner*—Geraldina Visconti
(74) *Attorney, Agent, or Firm*—Hahn & Voight PLLC; Roger C. Hahn

(57) ABSTRACT

A process to produce a polymer liquid crystalline composition having temperature dependency of desired circular polarization selective reflection wave length property by only mixing two or more kinds of starting materials having different weight-average molecular weight comprising, mixing two or more kinds of rigid rodlike helical polymers with chiral side chains having different weight-average molecular weight synthesized from same molecules and having same repeating unit whose molecular weight distribution defined by the ratio of weight average molecular weight/number average molecular weight is from 1.00 to 1.25, and controlling weight average molecular weight, number average molecular weight and molecular weight distribution by mixing ratio.

7 Claims, 4 Drawing Sheets

(a)

(b)

(a)

(b)

PROCESS FOR PRODUCING LIQUID CRYSTAL OF DESIRED PROPERTIES BY MIXING TOGETHER AT LEAST TWO RIGID RODLIKE HELICAL POLYMERS WITH NARROW MOLECULAR WEIGHT DISTRIBUTIONS AND DIFFERENT WEIGHT-AVERAGE MOLECULAR WEIGHTS WITH CHIRAL SIDE CHAINS

FIELD OF THE INVENTION

The present invention relates to a process for producing polymers showing desired liquid crystal property, in particular, showing cholesteric liquid crystal property by simply mixing rigid rodlike polymers having chiral side chains with narrow molecular weight distributions and different weight-average molecular weights whose molecular weight distribution and molecular weight are previously fixed.

DESCRIPTION OF THE PRIOR ART

The inventors of the present invention considered that the polymer for a desired object can be optinally produced by fractionating rigid rodlike helical optically active polysilanes with bimodal molecular weight distribution having optically active alkyl side chain group, which has a branching structure at β site, into polymer with specific molecular weight range and by observing the property of the fractionated polymer, and, found out a unique liquid crystal property by observing chemical property change along with the temperature change of the polymer whose molecular weight is relatively small (Japanese Patent Laid-Open Publication 2001-164251, published on Jun. 19, 2001).

That is, the inventors of the present invention found that polysilanes, which show cholesteric liquid crystal property, has a characteristic to alter circular polarization wave length property largely by difference of molecular weight and by temperature change.

Further, the inventors of the present invention synthesized poly(n-decyl-(s)-2-methylbutylsilane) (PD2MBS) by Wurtz type condensation process, fractionated it to the sample whose molecular distribution is from 1.05 to 1.20 and weight-average molecular weight (Mw) is from 20,000 to 50,000, and the liquid crystal constitution of the obtained sample was observed by a polarization microscope and the identification of liquid crystal phase was carried out by X ray (small angle X ray structural diffraction, wide angle X ray diffraction).

Then, the inventors of the present invention carried out the structural observation of PD2MBS whose weight-average molecular weight is 36700 and molecular weight distribution is 1.13, and reported that the polymer forms smectic A phase by the observation of small angle X ray structural diffraction, space-distance of layers is approximately corresponds to molecular length, smectic A phase transforms to cholesteric phase with elevation of temperature and reflection of wide angle X ray diffraction becomes sharp along with the drop of temperature [Liquid Crystal Forum; published on Sep. 27, 2001, No. 3D12, Polymer Forum; held on Sep. 13, 2001, No. II 17].

The subject of the present invention is to develop said former study and to provide a process to produce a polymer composition having temperature dependency of desired circular polarization selective reflection wave length property easily. On investigating the correlation of the polymer composition obtained by said observation with liquid crystal transferring behavior, the inventors of the present invention considered that, by observing what liquid crystal property is obtained when the polymer-fractions fractionated previously are mixed, by previously carrying out synthesis of polymer composition and fractionating the synthesized polymer composition, a polymer composition which meets to the requirement of the liquid crystal property can be obtained by simply mixing above mentioned fractionated polymers. Accordingly, the inventors of the present invention blended the polymer-fractions fractionated previously, observed the liquid crystal property of the blended composition and found out, for example, that the compound of liquid crystal property having temperature dependency of desired circular polarization selective reflection wave length property can be obtained with good reproducibility, thus the subject of the present invention could be dissolve.

SUMMARY OF THE INVENTION

The present invention is a process to produce a polymer liquid crystalline composition having temperature dependency of desired circular polarization selective reflection wave length property by only mixing two or more kinds of starting materials obtained by fractionation having different weight-average molecular weight comprising, mixing two or more kinds of rigid rodlike helical polymers with chiral side chains having different weight-average molecular weight synthesized from same molecule and with same repeating unit whose molecular weight distribution indicated by the ratio of weight average molecular weight/number average molecular weight is from 1.00 to 1.25, and controlling weight average molecular weight, number average molecular weight and molecular weight distribution by mixing ratio.

Desirably, the present invention is a process to produce a polymer liquid crystalline composition which shows temperature dependency of desired circular polarization selective reflection wave length property by thermo-tropic liquid crystalline phase by only mixing two or more kinds of starting materials whose weight average molecular weight are different.

In above mentioned inventions, the present invention is the process to produce a polymer liquid crystalline composition having temperature dependency of desired circular polarization selective reflection wave length property by only mixing two or more kinds of starting materials having different weight-average molecular weight whose molecular weight distribution and weight average molecular weight are previously fixed comprising, the polymer compositions having two or more kind of different weight average molecular weight, which are polymers synthesized from molecules whose rigid rodlike helical repeating unit having chiral side chain with fixed molecular weight distribution and weight average molecular weight, wherein said polymer composition is the polymer having a repeating unit represented by following general formula A.

general formula A

[in general formula A, R$^1$ and R$^2$ are the groups selected independently from alkyl group of carbon number 2-22 or alkyl group of carbon number 2-22 having aryl group at the end, $R^3$ is a chiral alkyl group having branch structure at β site, R* is a chiral alkyl group having branch structure at α site, β site (or γ site), left-handed (S) and/or right-handed (R) and when (S) and (R) are existing together with, at least 1% of either is contained. m≧0, (n+m)≧0.01]

Desirably, the present invention is the process to produce a polymer liquid crystalline composition having temperature dependency of desired circular polarization selective reflection wave length property by only mixing two or more kinds of starting materials having different weight-average molecular weight whose molecular weight distribution and weight average molecular weight are previously fixed, wherein the weight-average molecular weight of the polymers to be mixed is from 10000 to 100000.

BRIEF ILLUSTRATION OF THE DRAWINGS

FIG. 1 shows the GPC elution curve of fractionated sample Fr11 (a) mentioned in Table 1 and GPC elution curve of fractionated sample prepared by mixing Fr10 to fractionated sample 11 by mixing ratio of 7:3 (b).

FIG. 2 shows the temperature dependency of circular dichroism selective reflection spectrum of fractionated sample Fr11 (a) mentioned in Table 1 and the temperature dependency of circular dichroism selective reflection spectrum of mixed specimen prepared by mixing fractionated sample Fr11 and Fr10 by mixing ratio of 7:3 (b). Since vertical axis and elliptic modulus are in proportion to the thickness of the specimen, arbitrary number is used.

DESCRIPTION OF THE PREFERRED EMBOBYMENT

Figure 1:
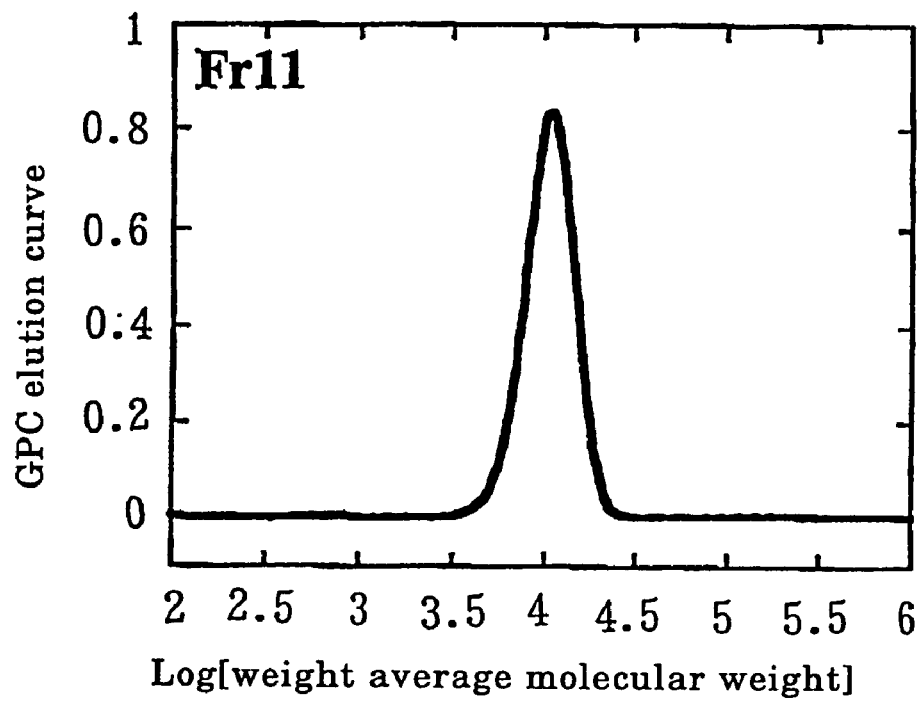
Figure 1:
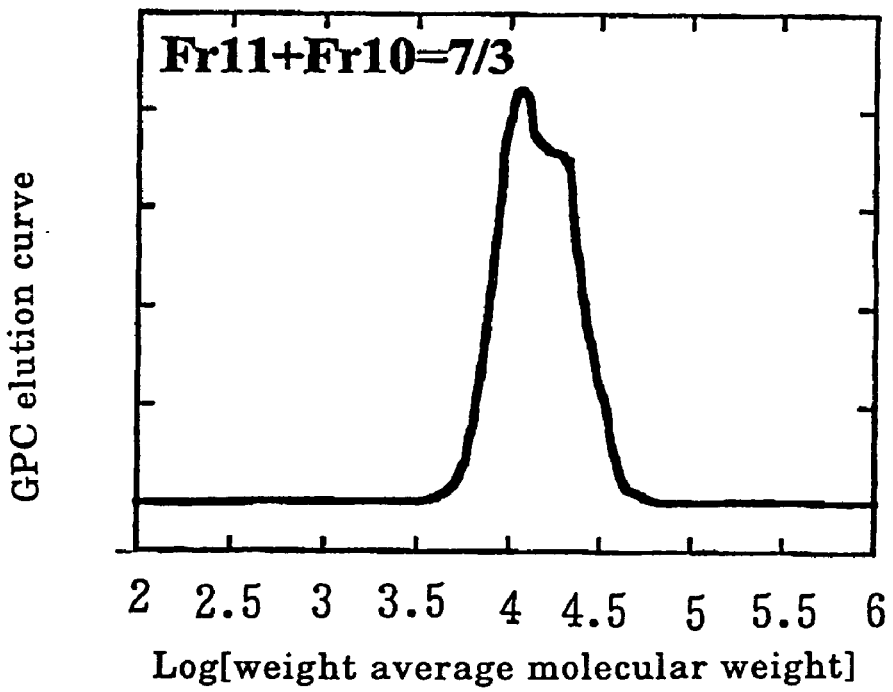

A. Production of Polymer Compositions and Fractionated Polymers Used in the Present Invention.

(1) Synthesis of n-decyl-(S)-2-methylbutyldichlorosilane, which is the Starting Material Polymer.

3.9 g (0.16 mol) of magnesium was contained into a dry 300 mL three-necked flask and replaced by argon gas. 50 mL of tetrahydrofurane (hereinafter shortened to THF) was added and heated to 70° C. Then small amount of dibromobutane was added and stirred so as to activate the surface of magnesium. 14.3 g (0.13 mol) of 1-chloro-(S)-2-methylbutane was dropped by a dropping funnel and stirred for 2 hours. Then cooled down to room temperature and Grignard reagent was obtained.

After that, THF (50 mL) and 44.25 g (0.16 mol) of n-decyltrichlorosilane were poured into a dry 300 mL three-necked flask. The temperature was elevated to 60° C. and the obtained THF solution of Grignard reagent was dropped in it slowly. The obtained product was pressed, filtrated and 33.26 g of crude product was obtained, then was distilled and fractionated by a vacuum distillater (0.8 mHg) utilizing the difference of boiling point of dichlorosilane [100° C. (0.8 mHg)] which is the subjected product and that of trichlorosilane [130° C. (0.8 mHg)] which is the starting material.

(2) Synthesis of Polysilane

Inside of 500 mL three-necked flask, which is a reacting vessel was degassed well and replaced by argon gas. 18-crown ether-6 (34.0 mg) was contained in said reacting vessel and heated to 120° C. (on oil bath). 0.3 g (12.84 mmol) of sodium metal and 50 mL of dehydrated toluene were added into the reacting vessel and 2.0 g (6.42 mmol) of starting material monomer was dropped slowly with constant stirring. When viscosity became high, viscosity was reduced by adding dehydrated toluene. After stirring for 2 hours, reacted mixed solution was filtrated by pressing. A polymer before purification was a bimodal polymer having peaks at approximately 80 and 50000 of molecular weight.

(3) Fractionation of Polymer

To the toluene solution of polymer after all synthesis processes were completed, small amount of isopropylalcohol was added and from the high molecular weight components were precipitated. Generated precipitation was centrifuged, filtrated by press filtration and dried by vacuum drying so as to obtain a fractionated sample. By repeating same process on residue solution, from higher molecular weight fraction to lower molecular weight fraction was fractionated in order. The solvent to be added was changed in order from isopropylalcohol to ethanol, to methanol and to water in connection with polymer molecular weight fractionated. Fractions obtained by said fractionation process are summarized in Table 1.

TABLE 1

| Fraction (Fr) | Mw | Mn | Mw/Mn |
|---|---|---|---|
| Fr1 | 505300 | 183300 | 2.76 |
| Fr2 | 149300 | 127700 | 1.17 |
| Fr3 | 96100 | 85500 | 1.13 |
| Fr4 | 76600 | 69700 | 1.10 |
| Fr5 | 63600 | 58800 | 1.08 |
| Fr6 | 49000 | 44800 | 1.09 |
| Fr7 | 38500 | 35699 | 1.08 |
| Fr8 | 31700 | 29700 | 1.07 |
| Fr9 | 25500 | 24000 | 1.06 |
| Fr10 | 20900 | 19700 | 1.06 |
| Fr11 | 11100 | 10000 | 1.11 |

EXAMPLE

The present invention will be illustrated more in detail according to the following Examples. However, these Examples are intending to make obvious the usefulness of the present invention and not intending to limit the scope of the claims of the present invention.

Measuring condition;

GPC: Product of Waters, 150-Ctype, Gel osmotic chromatography

Circular dichroism measurement: Product of Nihon Bunko Co., Ltd., J-720WI circular dichroism scattring meter

Example 1

Liquid crystal properties of polymer composition obtained by mixing of said fractionated fractions;

GPC elution curves of fractionated sample Fr11, which is in Table 1, and specimen prepared by mixing this Fr11 with Fr10 by mixing ratio of 7:3 are shown in (a) and (b) in FIG. 1. Weight average molecular weight of the specimen becomes (Mw)=13700, Mw/Mn=1.18 by mixing and accordingly molecular weight distribution is relatively broadened.

Figure 2:
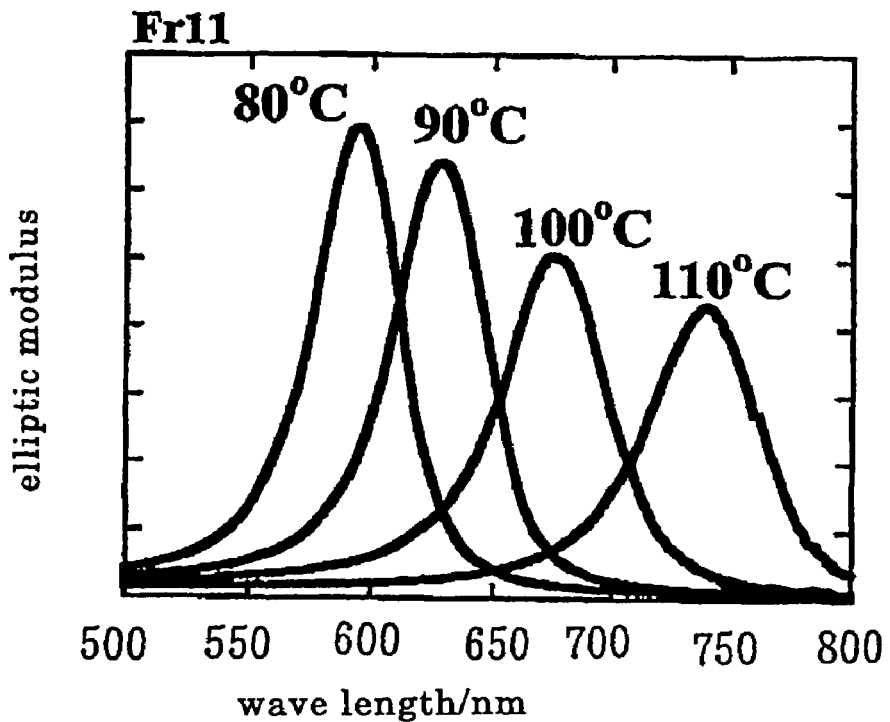
Figure 2:
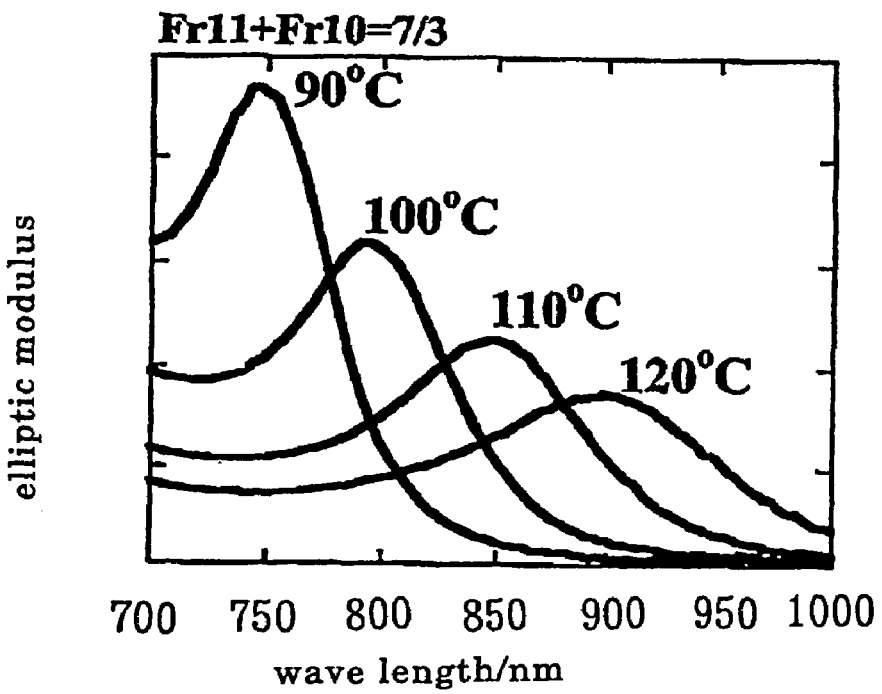

FIG. 2(a) shows the temperature dependency of circular dichroism selective reflection spectrum of fractionated sample Fr11 and FIG. 2(b) shows the temperature dependency of circular dichroism reflection spectrum of mixed specimen prepared by mixing fractionated sample Fr11 and Fr10 by mixing ratio of 7:3. When compared by same measuring temperature, it is obvious that the peak wavelength of circular dichroism selective reflection spectrum shifts to longer wave-length region by mixing of Fr10 to Fr11. From this fact, it is understood that the specimen having a desired circular polarization selective reflection property can be produced by mixing different fractions. And, it can be predicted that the circular polarization selective reflection property can be adjusted by adjusting mixing ratio of different fractions. Further, it can be easily predicted that such property generates when mixing fraction is changed.

Example 2

Figure 3:
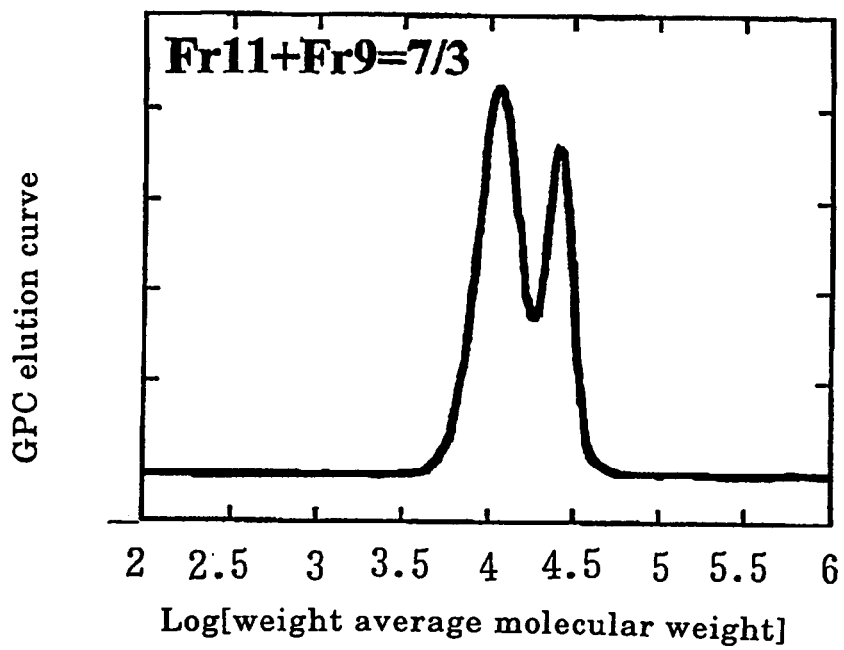
FIG. 3 shows the GPC elution curve of specimen prepared by mixing fractionated sample Fr11 and Fr9 mentioned in Table 1 by mixing ratio of 7:3.

FIG. 3 shows the GPC elution curve of specimen prepared by mixing fractionated sample Fr11 and Fr9 mentioned in Table 1 by the mixing ratio of 7:3. Weight average molecular weight of the mixed specimen becomes (Mw)=16600, Mw/Mn=1.26 by mixing and molecular weight distribution is broadened along with the increase of the difference of molecular weight of the mixed 2 specimens.

Figure 4:
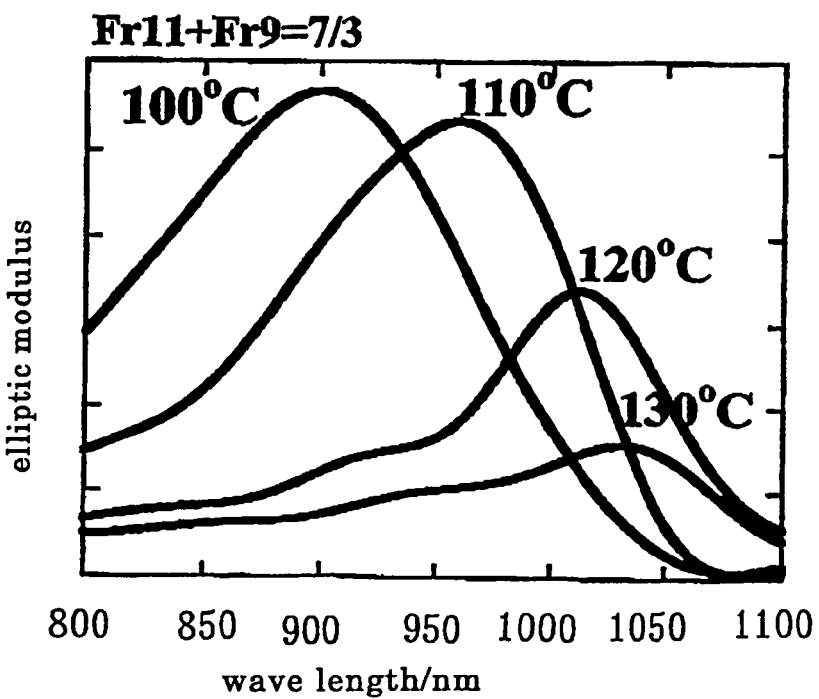
FIG. 4 shows the temperature dependency of circular dichroism spectrum of specimen prepared by mixing fractionated sample Fr11 and Fr9 mentioned in Table 1 by mixing ratio of 7:3. Since vertical axis and elliptic modulus are in proportion to the thickness of the specimen, arbitrary number is used.

FIG. 4 shows the temperature dependency of circular dichroism spectrum of a specimen prepared by mixing preparative specimen Fr11 and Fr9 mentioned in Table 1 by the mixing ratio of 7:3. When compared with circular dichroism spectrum (CD) [(b) of FIG. 2] of mixture of Fr11 and Fr10 by 7:3 mixing ratio, the peak wave-length of circular dichroism reflection spectrum is more remarkably shifted to longer wave-length side, and it is clear that there is strong correlation between adjusted molecular weight and shifting value of circular polarization selective reflection wave-length of cholestric liquid crystal phase.

Figure 5:
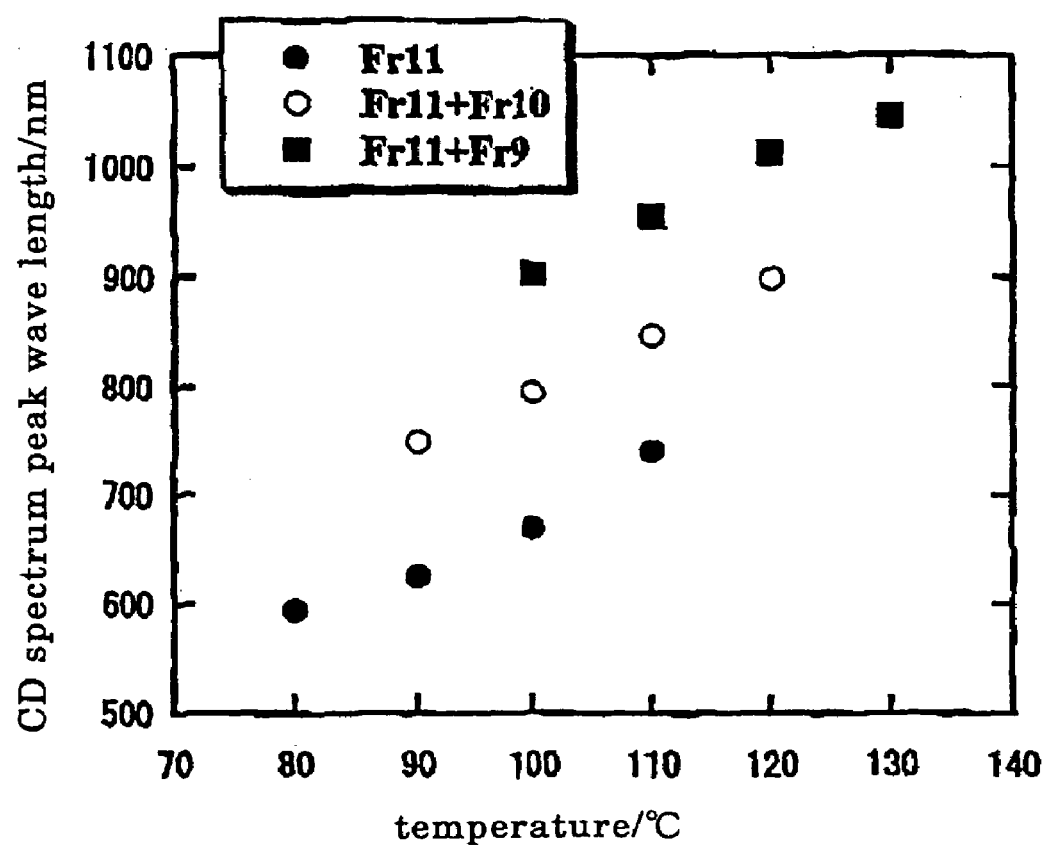
FIG. 5 shows the temperature dependency of the peak wave-length of circular dichroism selective reflection spectrum at each temperature of fractionated sample Fr11 (●) mentioned in Table 1, specimen prepared by mixing fractionated sample Fr11 and Fr10 by mixing ratio of 7:3 (○) and specimen prepared by mixing fractionated sample Fr11 and Fr9 by mixing ratio of 7:3 (□).

The peak wave-length of circular dichroism selective reflection spectrum of fraction Fr11, specimen prepared by mixing Fr11 and Fr10 by the mixing ratio 7:3 and specimen prepared by mixing Fr11 and Fr9 by mixing ratio 7:3 are shown in FIG. 5. Correlation of adjusted molecular weight with shifting value of circular polarization selective reflection wave-length of cholestric liquid crystal phase can be observed more clearly. From this fact, it is understood that the specimen having desired circular polarization selective reflection spectrum can be produced by adjusting molecular weight by mixing.

INDUSTRIAL APPLICABILITY

As mentioned above, by the present invention, following excellent effect can be expected. That is, by previously separating rigid rodlike helical optical active organic polymers having chiral side chains to components whose molecular weight distribution indicated by ratio of weight average molecular weight/number average molecular weight is in the range from more than 1.00 to less than 1.25 and having different weight average molecular weight, the polymer composition whose liquid crystallinity which shows desired properties, especially phase transfer temperature and temperature dependency of optical property are optionally adjusted can be obtained by mixing 2 or more above mentioned separated components. Further, by using the said liquid crystal property, the excellent effect, for example, molecular devices, for example, optical device, memory material or recognition sensor for chemical substances can be produced simply and by low cost without using a large-size manufacturing facility, can be accomplished.

The invention claimed is:

1. A process to produce a polymer liquid crystalline composition having temperature dependency of a circular polarization selective reflection wave length property by mixing two or more starting materials obtained by fractionation having different weight-average molecular weight comprising, mixing two or more rigid rodlike helical polymers with chiral side chains having different weight-average molecular weight synthesized from same molecule and with same repeating unit whose molecular weight distribution defined by the ratio of weight average molecular weight/ number average molecular weight is from 1.00 to 1.25, and controlling weight average molecular weight, number average molecular weight and molecular weight distribution by mixing ratio.

2. A process to produce a polymer liquid crystalline composition which shows temperature dependency of a circular polarization selective reflection wave length property by thermo-tropic liquid crystalline phase by mixing two or more starting materials obtained by fractionation whose weight average molecular weight are different.

3. The process to produce a polymer liquid crystalline composition having temperature dependency of said circular polarization selective reflection wave length property by mixing two or more kinds of starting materials having different weight-average molecular weight whose molecular weight distribution and weight average molecular weight are previously fixed comprising, the polymer compositions having two or more different weight average molecular weight, which are polymers synthesized from molecules whose rigid rodlike helical repeating unit having chiral side chain of claim 2, wherein said polymer composition is the polymer having a repeating unit represented by following general formula A,

general formula A wherein, $R_1$ and $R_2$ are the groups selected independently from alkyl group of carbon number 2-22 or alkyl group of carbon number 2-22 having aryl group at the end, $R_3$ is a chiral alkyl group having branch structure at β site, R* is a chiral alkyl group having branch structure at α site, β site or γ site, left-handed (S) and/or right-handed (R) and when (S) and (R) are existing together with, at least 1% of either is contained, $m \geq 0$ and $n+m \geq 0.01$.

4. The process to produce a polymer liquid crystalline composition having temperature dependency of said circular polarization selective reflection wave length property by mixing two or more starting materials having different weight-average molecular weight whose molecular weight distribution and weight average molecular weight are previously fixed of claim 3, wherein the weight-average molecular weight of the polymers to be mixed is from 10000 to 100000.

5. The process to produce a polymer liquid crystalline composition having temperature dependency of said circular polarization selective reflection wave length property by mixing two or more of starting materials having different weight-average molecular weight whose molecular weight distribution and weight average molecular weight are previously fixed comprising, the polymer compositions having two or more different weight average molecular weight, which are polymers synthesized from molecules whose rigid rodlike helical repeating unit having chiral side chain of claim 1, wherein said polymer composition is the polymer having a repeating unit represented by following general formula A, general formula A

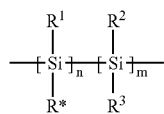

wherein, $R_1$ and $R_2$ are the groups selected independently from alkyl group of carbon number 2-22 or alkyl group of carbon number 2-22 having aryl group at the end, $R_3$ is a chiral alkyl group having branch structure at β site, R* is a chiral alkyl group having branch structure at α site, β site or γ site, left-handed (S) and/or right-handed (R) and when (S) and (R) are existing together with, at least 1% of either is contained, m≧0 and n+m≧0.01.

6. The process to produce a polymer liquid crystalline composition having temperature dependency of said circular polarization selective reflection wave length property by mixing two or more starting materials having different weight-average molecular weight whose molecular weight distribution and weight average molecular weight are previously fixed of claim 5, wherein the weight-average molecular weight of the polymers to be mixed is from 10000 to 100000.

7. The process to produce a polymer liquid crystalline composition having temperature dependency of said circular polarization selective reflection wave length property by mixing two or more starting materials having different weight-average molecular weight whose molecular weight distribution and weight average molecular weight are previously fixed of claim 1, wherein the weight-average molecular weight of the polymers to be mixed is from 10000 to 100000.

* * * * *